Jan. 19, 1954
C. E. McCOY ET AL
2,666,255
ARTICLE FEEDING DEVICE
Filed Oct. 29, 1951
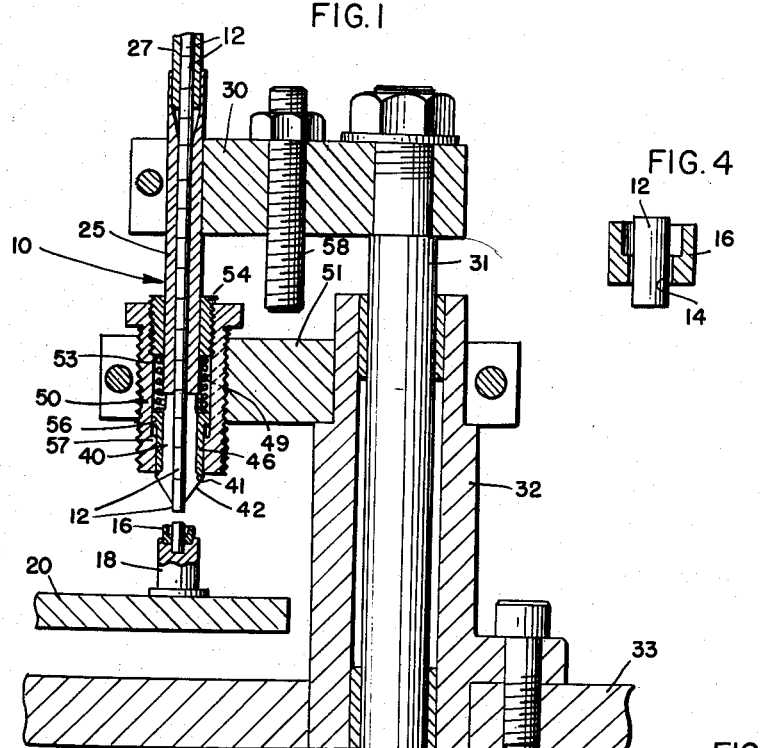
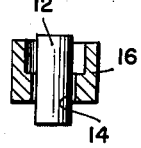
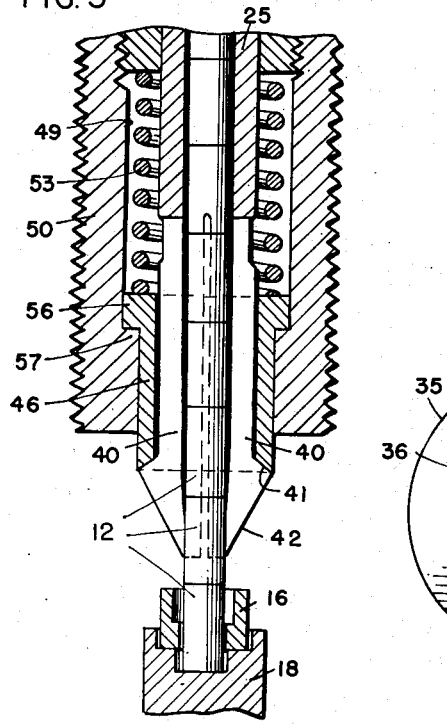
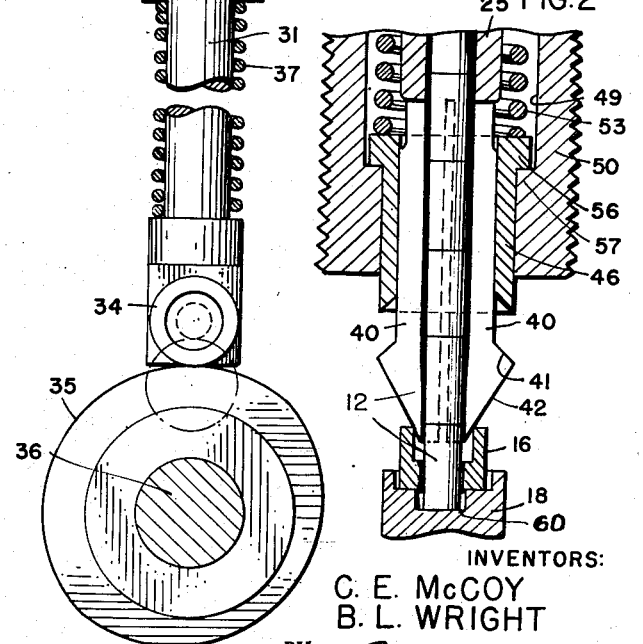
INVENTORS:
C. E. McCOY
B. L. WRIGHT
BY
ATTORNEY Patented Jan. 19, 1954

2,666,255

UNITED STATES PATENT OFFICE 2,666,255

ARTICLE FEEDING DEVICE

Clarence E. McCoy, Clarendon Hills, and Ben L. Wright, Chicago, Ill., assignors to Western Electric Company, Incorporated, New York, N. Y., a corporation of New York Application October 29, 1951, Serial No. 253,722

3 Claims. (Cl. 29—211)

This invention relates to a device for feeding articles and more particularly to a gravity feed device for successively releasing and feeding the lowermost one of a column of articles into a bore in a hollow article.

It is an object of the present invention to provide an effective and efficient feed device of simple construction for feeding articles one at a time to a predetermined position.

It is a further object of the invention to provide a simple and effective device to feed the lowermost one of a column of parts into a hollow member and to align the member with the part during the feeding thereof.

In accordance with the present invention, there is provided a vertically disposed feed tube into the bore of which a supply of cylindrical carbon blocks is placed for movement therethrough by gravity. The lower end of the feed tube is slotted to provide a plurality of flexible gripping fingers forming a collet having an annular sloping shoulder against which a spring pressed actuating sleeve acts to close the collet into gripping engagement with the carbon block positioned in the lower end of the feed tube. The feed tube is movable to and from an upper position and a lower position in the latter of which the lower tapered end of the collet on the feed tube extends into a hollow porcelain block to center the porcelain block and align the carbon blocks with the aperture therein. The actuating sleeve engages a stop at a predetermined point during the downward movement of the collet to permit the collet to open and release its grip on the lowermost carbon block and allow the column of carbon blocks to move downwardly by gravity and to guide the lowermost carbon block into the porcelain block as the feed tube continues its downward movement. The collet remains open during the first portion of the upward movement of the feed tube until the end of the collet is raised above the lowermost carbon block after which the actuating sleeve serves to close the collet on the carbon block above the one inserted in the porcelain block and carry it and the column of blocks supported thereon upwardly a predetermined distance to permit the removal of the loaded holder from under the feed tube and the alignment of an unloaded holder thereunder.

Other objects and advantages of the invention will become apparent by reference to the following detailed description thereof when considered in connection with the accompanying drawings illustrating a preferred embodiment of the invention, in which Fig. 1 is a vertical sectional view through the feed device and the actuating mechanism therefor;

Figs. 2 and 3 are enlarged fragmentary views of the feeding device showing parts thereof in changed positions; and Fig. 4 is a sectional view of the parts being assembled in the present feed device.

The present feeding device 10 is designed to feed articles 12 in the form of short carbon rods or blocks of cylindrical shape into a bore 14 in the bottom wall of a hollow cylindrical porcelain block 16. The procelain blocks 16 are supported in the upper recessed ends of holders 18 mounted in spaced relation to each other on a feed table 20 which is periodically indexed to position successive holders 18 and porcelain blocks 16 therein at a loading station below and in vertical alignment with the feeding device.

The feeding device 10 comprises a vertically disposed feed tube 25 having a cylindrical bore therein for receiving a plurality of the carbon blocks 12 therein for movement therethrough. At its upper end the bore therein is enlarged to telescopingly receive a stationary guide tube 27 having a passageway therethrough in alignment with the bore in the feed tube and into which the carbon blocks 12 are loaded and guided for downward movement by gravity. The feed tube 25 is supported on an arm 30 fixed to the upper end of a rod 31 which is slidably mounted in a bearing bracket 32 which in turn is fixed to a table or frame member 33. A cam roller 34 on the lower end of the rod 31 engages a cam 35 secured to a shaft 36 which is rotated by mechanism (not shown) which also indexes the feed table 20 in timed relation therewith. Thus, the cam 35 serves to elevate the feed tube 25 and a spring 37 on the rod 31 serves to move the feed tube 25 downwardly in cooperation with the cam.

The lower portion of the tube 25 is longitudinally slit to provide a plurality of flexible fingers 40 forming a collet which has an annular sloping cam surface 41 and a tapering end surface 42. A collet actuating sleeve 46 is telescopingly mounted on the collet for movement therewith and axial movement relative thereto and has an outer cylindrical surface which is slidably mounted in a cylindrical bore 49 in a cylindrical guide member 50. The cylindrical guide member 50 is exteriorly threaded and adjustably secured in a threaded aperture in an arm 51 fixed to the upper end of the bearing bracket 32. A helical compression spring 53 is interposed between the upper end of the collet actuating sleeve 46 and an exteriorly threaded collar 54 adjustably secured in the threaded enlarged upper portion of the bore 49 of the guide member 50. The spring 53 urges the actuating sleeve 46 downwardly into engagement with the cam surfaces 41 to close the collet into gripping engagement with a carbon block 12 positioned in the lower end of the feed tube 25. The collet actuating sleeve 46 is movable with the collet through a predetermined limited distance, its movement downwardly being arrested by the engagement of a shoulder 56 on the sleeve with a shoulder 57 on the guide member 50. A threaded rod 58 adjustably mounted on the arm 30 is engageable with the stationary arm 51 to limit the downward movement of the feed tube 25 to a predetermined position.

With the feed tube 25 filled with a column of cylindrical carbon blocks 12 which are supplied thereto from the gravity feed tube 27 into which the carbon blocks may be placed by any suitable means, and with the feeding device in its upper position as shown in Fig. 1, the spring fingers of the collet are compressed into gripping engagement with the lowermost carbon block 12 by the downward pressure of the spring stressed actuating sleeve 46 to support the column of carbon blocks within the feed tube 25 and the tube 27. With a holder 18 and a porcelain block 16 at the loading station below and in axial alignment with the feed tube 25 and in response to the rotation of the cam 35, the feed tube 25 is moved downwardly, carrying with it the actuating sleeve 46 and the column of carbon blocks 12. At a predetermined point in the downward movement of the feed tube 25 the movement of the actuating sleeve 56 is arrested by the engagement of the shoulders 56 and 57 and further downward movement of the feed tube 25 causes the collet 40 to open and release its gripping engagement with the lowermost carbon block and permit the column of carbon blocks 12 to drop by gravity.

After the cam surface 41 on the collet moves away from the end of the actuating sleeve 46 to cause the collet 40 to be actuated to its open position, the feed tube 25 continues its movement downwardly to its lower position shown in Fig. 2, in which position the lower end of the collet 40 is positioned within the hollow porcelain block 16 and the tapered surfaces 42 on the collet engage the inner upper edge of the porcelain block and align the block 16 with the feed tube 25 and the blocks 12 therein to guide the lowermost carbon block 12 into the aperture 14 of the block 16. The downward movement of the column of blocks 12 is arrested when the lowermost carbon block is properly positioned within the aperture 14 of the porcelain block 16 and engages the bottom surface of the recess 60 in the holder 18 as shown in Fig. 2.

As the feed tube 25 is moved upwardly the jaws of the collet 40 remain open until they have moved above the top portion of the lowermost carbon block 12 and arrive at the position indicated in Fig. 3, where the cam surfaces 40 again engage the end of the actuating sleeve 56 and the collet is actuated to closed position to grip the next to the lowermost carbon block. Continued movement of the feed tube 25 to its upper position carries the column of blocks 12 therewith and causes a separation between the lowermost and the next adjacent block thereto as indicated in Fig. 1 to permit indexing movement of the feed table 20 and the initiation of another feeding cycle.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A device for feeding articles onto parts movable into a predetermined position at a loading station comprising a vertically disposed feed tube for guiding a plurality of articles for movement therethrough by gravity and having a plurality of flexible fingers forming a collet at the lower end thereof, said fingers having cam surfaces thereon, stationary guide means for supporting said feed tube for vertical movement above and in alignment with said loading station, a collet actuating sleeve slidably mounted on said collet and engageable with said cam surfaces, resilient means stressing said sleeve for movement in one direction to actuate said fingers into gripping engagement with an article positioned in the end of said feed tube to support a column of articles in said feed tube, means for reciprocating said feed tube to and from a lower position in a predetermined spaced relation to a part in said loading station, a stop member engageable with said actuating sleeve, and means for adjustably supporting said stop member on said stationary guide means at a predetermined position for stopping the downward movement of said actuating sleeve at a predetermined point prior to the end of the movement of the feed tube to its lower position to effect the release and movement of said column of articles and the movement of the lowermost article from the feed tube and into engagement with said part and to effect the actuation of said collet to grip one of the articles above the lowermost article and raise it and the column of articles supported thereby as the feed tube is moved from its lower position.

2. A device for feeding cylindrical articles into elements having apertures therein of various diameters comprising a vertically disposed feed tube for guiding a plurality of said articles for movement therethrough by gravity, said feed tube having a plurality of flexible fingers provided with cam surfaces and conical guide surfaces thereon to form a collet having a tapered end portion, a collet actuating sleeve slidably mounted on said collet for movement therewith and engageable with said cam surfaces, resilient means stressing said sleeve for movement in one direction to actuate said collet to a closed position into gripping engagement with an article positioned in the end of said collet to support a column of articles in said feed tube, a holder for supporting one of said apertured elements in a predetermined position below said feed tube, means for reciprocating said feed tube to and from a lower position in predetermined relation to said holder to cause the tapered end of said collet to engage the element in the enlarged portion of the aperture therein and align the element with the feed tube and to guide the article into the reduced portion of the aperture, and means for stopping said actuating sleeve at a predetermined position during the movement of said feed tube to its lower position for causing the actuation of said collet to open position to effect the release and the movement of said column of articles into engagement with said holder, said collet being actuated to a closed position during its movement away from said holder to grip an article above the article positioned in said element and to raise said gripped article and the column of articles supported thereby.

3. In an apparatus having a plurality of holders indexible to a loading station for supporting elements having recesses therein of various diameters, the combination therewith of a vertically disposed feed tube for guiding a plurality of articles for movement therethrough by gravity, stationary means for guiding said feed tube for vertical movement toward and away from a holder at said loading station, means operable in timed relation to the indexing of said holder for reciprocating said feed tube to and from a lower position in a predetermined spaced relation to said holder, said feed tube having a tapered lower end operable in said lower position of the feed tube to engage the element in the enlarged portion of the aperture therein to align the element with the feed tube and guide the article into the reduced portion of the aperture in the element, a plurality of flexible fingers associated with said feed tube and forming a portion thereof, said flexible fingers forming a collet having cam surfaces thereon, a collet actuating member mounted on said collet for movement therewith and engageable with the cam surfaces, resilient means stressing said actuating member for movement in one direction to actuate said collet to a closed position into gripping engagement with an article in said feed tube to support a column of articles therein, and means for stopping said actuating sleeve at a predetermined position during the movement of said feed tube toward said holder to cause the actuation of said collet to open position to effect the release and movement of said column of articles toward said holder, said collet being actuated to a closed position during its movement away from said holder to grip one of said articles above the article inserted in said element and to raise said gripped article and the column of articles supported thereby.

CLARENCE E. McCOY.
BEN L. WRIGHT.

References Cited in the file of this patent
UNITED STATES PATENTS

| Number | Name | Date |
|---|---|---|
| 381,612 | Bussler | Apr. 24, 1888 |
| 584,999 | Goldsmith et al. | June 22, 1897 |
| 1,311,128 | Kilgour | July 22, 1919 |
| 1,884,683 | Hermani | Oct. 25, 1932 |
| 1,910,138 | Van Hooydonk | May 23, 1933 |
| 1,941,992 | Makenny | Jan. 2, 1934 |
| 1,953,476 | Gilbert | Apr. 3, 1934 |
| 2,134,570 | Meilner | Oct. 25, 1938 |
| 2,156,651 | Gardiner | May 2, 1939 |
| 2,397,872 | Kovacs | Apr. 2, 1946 |